(No Model.)

G. DAMEN.
Folding Bath Tub.

No. 237,494. Patented Feb. 8, 1881.

WITNESSES:

INVENTOR:
G. Damen
BY
ATTORNEYS.

UNITED STATES PATENT OFFICE.

GEORGE DAMEN, OF SOUTH BROOKLYN, NEW YORK.

FOLDING BATH-TUB.

SPECIFICATION forming part of Letters Patent No. 237,494, dated February 8, 1881.

Application filed December 16, 1880. (No model.)

*To all whom it may concern:*

Be it known that I, GEORGE DAMEN, of South Brooklyn, in the county of Kings and State of New York, have invented a new and useful Improvement in Folding Bath-Tubs, of which the following is a specification.

Figure 1:
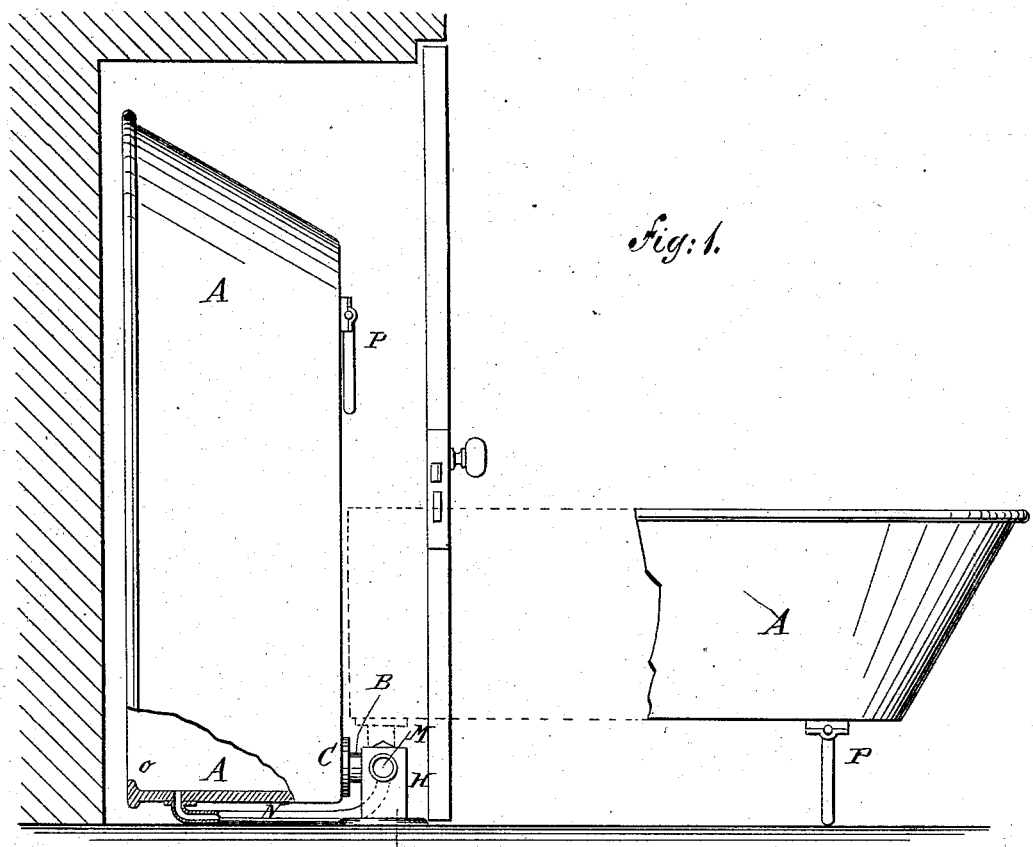
Figure 2:
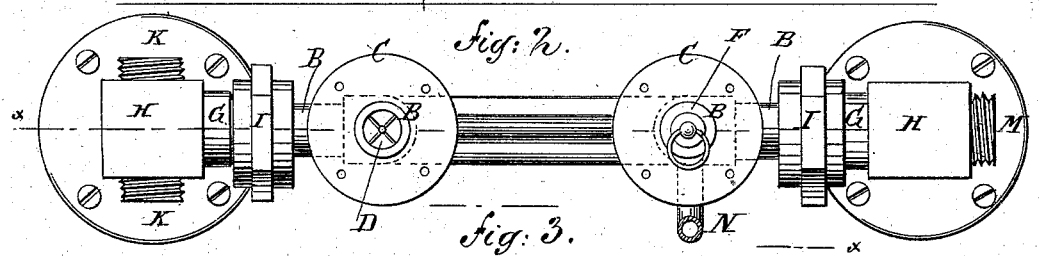
Figure 3:
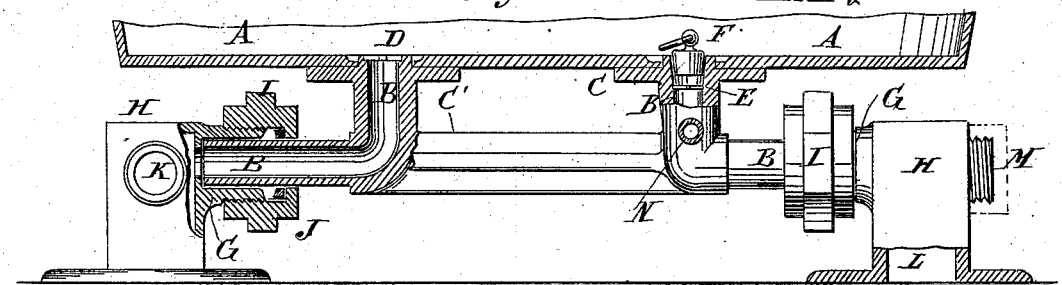

Figure 1 is a side elevation of the improvement folded, partly in section, and indicating its position when lowered. Fig. 2 is a plan view of the hinging connection. Fig. 3 is a sectional elevation taken through the line $xx$, Fig. 2.

Similar letters of reference indicate corresponding parts.

The object of this invention is to construct bath-tubs in such a manner that they can be raised into a vertical position when not required for use.

A represents a bath-tub, to the foot of which are attached the upper ends of two bent pipes, B. The bends of the pipes B are connected by a bar, C', which is designed to be cast in one piece with the said pipes B. Upon the pipes B are cast flanges C, to rest against the bottom of the bath-tub A and receive the fastening-screws.

The flanges C can be cast as a continuous plate, to make the connection between the pipes B stronger. The ends of the pipes B project above the flanges C, so as to pass through the bottom of the bath-tub and be flush with its inner surface, and the connection between the said pipes and bottom is made water-tight with solder.

The inner end of the inlet-pipe B is provided with a strainer, D, and the outlet-pipe B, at a little distance from its inner end, is provided with a strainer, E. The inner surface of the inner end of the outlet-pipe B is turned out to receive the plug F, that closes the said outlet-pipe B, and is designed to be connected with the upper part of the bath-tub A by a small chain in the ordinary manner. The outer ends of the pipes B are inserted in nipples G, formed upon the inner sides of the studs H, the lower ends of which are flanged to receive the screws that secure the said studs H to the floor. The pipes B and studs H thus form a hinge for connecting the bath-tub to the floor, so that the said bath-tub can be turned up into a vertical position when not required for use.

The ends of the nipples G are concaved or beveled upon their inner edges, and upon their outer surfaces are cut screw-threads to receive the cap-nuts I, through which the pipes B pass. Within each nut I is placed a washer, J, the side of which next the end of the nipple G is beveled, so that the beveled end of the said nipple and the beveled side of the washer J will press packing placed between them upon the pipe B down closely upon the said pipe when the nut I is screwed up. The stuffing-boxes thus formed prevent any water from escaping around the pipes B.

Upon the opposite sides of the stud H, with which the inlet-pipe B is connected, are formed nipples K, having screw-threads upon their outer surfaces that receive couplings that connect the water-pipes with the said nipples.

The cold-water pipe is designed to be connected with one of the nipples K and the hot-water pipe with the other; or the hot and the cold water pipes can be connected with a single pipe and the single pipe connected with one of the nipples, so that hot and cold water can be introduced through a single nipple, in which case the other nipple K should be closed with a screw-cap.

The stud H, connected with the discharge-pipe B, has an opening, L, in its bottom, with which the waste-pipe can be connected; or the opening L can be closed with a plug and the waste-pipe coupled to a nipple, M, upon the side of the stud H. The nipple M is closed by a screw-scap when the waste-pipe is connected with the opening L.

N is the overflow-pipe, the upper end of which is connected with an aperture in the upper part of the foot of the bath-tub A. The lower end of the overflow-pipe N is connected with an aperture in the discharge-pipe B.

The upper edge of the bath-tub A has an inwardly-projecting ledge or flange, O, formed upon it to prevent any drippings of water left in the bath-tub from trickling upon the floor when the bath-tub is turned up into a vertical position.

To the head part of the bottom of the bath-tub A is hinged a leg or frame, P, to support the head of the said bath-tub when lowered into a horizontal position, which hinged frame or leg P folds down against the bottom of the bath-tub when the said bath-tub is raised into a vertical position.

With this construction the bath-tub can be arranged in a small closet or casing, into which it can be shut up when raised into a vertical position, as shown in Fig. 1, and through the door of which it can be lowered into a horizontal position when required for use, so that the convenience of a bath-tub can be had with the sacrifice of very little room.

Having thus fully described my invention, I claim as new and desire to secure by Letters Patent—

The combination, with a bath-tub, of the flanged and elbowed pipes B and the studs H, having nipples K G, the latter forming, with pipes B, hinge-joints, and provided with cap-nuts I, as shown and described.

GEORGE DAMEN.

Witnesses:
JAMES T. GRAHAM,
C. SEDGWICK.